(12) United States Patent
Claessens et al.

(10) Patent No.: US 11,256,053 B2
(45) Date of Patent: Feb. 22, 2022

(54) FIBER MANAGEMENT TRAY FOR DROP TERMINAL

(71) Applicant: COMMSCOPE TECHNOLOGIES LLC, Hickory, NC (US)

(72) Inventors: Bart Mattie Claessens, Hasselt (BE); Erwin Beckers, Werchter (BE)

(73) Assignee: CommScope Technologies LLC, Hickory, NC (US)

( * ) Notice: Subject to any disclaimer, the term of this patent is extended or adjusted under 35 U.S.C. 154(b) by 15 days.

(21) Appl. No.: 16/640,326

(22) PCT Filed: Aug. 23, 2018

(86) PCT No.: PCT/US2018/047746
§ 371 (c)(1),
(2) Date: Feb. 19, 2020

(87) PCT Pub. No.: WO2019/040742
PCT Pub. Date: Feb. 28, 2019

(65) Prior Publication Data
US 2021/0080665 A1 Mar. 18, 2021

Related U.S. Application Data

(60) Provisional application No. 62/549,217, filed on Aug. 23, 2017.

(51) Int. Cl.
*G02B 6/00* (2006.01)
*G02B 6/44* (2006.01)
*G02B 6/38* (2006.01)

(52) U.S. Cl.
CPC ......... *G02B 6/4441* (2013.01); *G02B 6/3897* (2013.01); *G02B 6/4403* (2013.01); *G02B 6/4471* (2013.01)

(58) Field of Classification Search
CPC .. G02B 6/4441; G02B 6/3897; G02B 6/4403; G02B 6/4471; G02B 6/4472; G02B 6/00
See application file for complete search history.

(56) References Cited

U.S. PATENT DOCUMENTS

| | | | |
|---|---|---|---|
| 6,579,014 B2 | 6/2003 | Melton et al. | |
| 6,648,520 B2 | 11/2003 | McDonald et al. | |
| 6,899,467 B2 | 5/2005 | McDonald et al. | |
| 7,120,347 B2 | 10/2006 | Blackwell, Jr. et al. | |
| 7,239,789 B2 | 7/2007 | Grubish et al. | |
| 7,292,763 B2 | 11/2007 | Mertesdorf et al. | |

(Continued)

FOREIGN PATENT DOCUMENTS

| | | |
|---|---|---|
| WO | 2008/118603 A2 | 10/2008 |
| WO | 2017/162751 A1 | 9/2017 |

OTHER PUBLICATIONS

International Search Report and Written Opinion of the International Searching Authority for International Patent Application No. PCT/US2018/047746 dated Dec. 14, 2018, 13 pages.

(Continued)

*Primary Examiner* — Jennifer Doan
(74) *Attorney, Agent, or Firm* — Merchant & Gould P.C.

(57) ABSTRACT

A management tray is disposed inside a drop terminal to organize and guide optical fibers. The management tray may define an anchor station, connector storage stations, a splice retention station, a fallout station, and/or a splitter retention station.

20 Claims, 14 Drawing Sheets

(56) References Cited

U.S. PATENT DOCUMENTS

| | | | |
|---|---|---|---|
| 7,397,997 B2 | 7/2008 | Mertesdorf et al. | |
| 7,480,437 B2 * | 1/2009 | Ferris | G02B 6/3897 |
| | | | 385/134 |
| 7,489,849 B2 | 2/2009 | Reagan et al. | |
| 7,680,388 B2 * | 3/2010 | Reagan | G02B 6/3897 |
| | | | 385/139 |
| 7,844,158 B2 | 11/2010 | Gronvall et al. | |
| 7,941,027 B2 | 5/2011 | Mertesdorf et al. | |
| 2005/0213921 A1 | 9/2005 | Mertesdorf et al. | |
| 2006/0098932 A1 | 5/2006 | Battey et al. | |
| 2006/0153517 A1 | 7/2006 | Reagan et al. | |
| 2006/0283619 A1 | 12/2006 | Kowalczyk et al. | |
| 2007/0025674 A1 | 2/2007 | Kowalczyk et al. | |
| 2009/0148118 A1 | 6/2009 | Gronvall et al. | |
| 2011/0097050 A1 | 4/2011 | Blackwell, Jr. et al. | |
| 2012/0237173 A1 | 9/2012 | Alston et al. | |
| 2013/0251325 A1 | 9/2013 | Solheid et al. | |
| 2017/0168256 A1 | 6/2017 | Reagan et al. | |

OTHER PUBLICATIONS

Extended European Search Report for European Patent Application No. 18848029.7 dated Mar. 31, 2021, 8 pages.

* cited by examiner

FIBER MANAGEMENT TRAY FOR DROP TERMINAL

CROSS-REFERENCE TO RELATED APPLICATION

This application is a National Stage Application of PCT/US2018/047746, filed on Aug. 23, 2018, which claims the benefit of U.S. Patent Application Ser. No. 62/549,217, filed on Aug. 23, 2017, the disclosures of which are incorporated herein by reference in their entireties. To the extent appropriate, a claim of priority is made to each of the above disclosed applications.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. With the connectors and their associated fibers aligned within the adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described in U.S. Pat. Nos. 6,579,014, 6,648,520, and 6,899,467.

Fiber optic telecommunication technology is becoming prevalent in part because service providers want to deliver high bandwidth communication capabilities to subscribers. One such technology is referred to as passive optical networks (PONS). PONS may use optical fibers deployed between a service provider central office, or head end, and one or more end user premises. A service provider may employ a central office, or head end, containing electronic equipment for placing signals onto optical fibers running to user premises. End user premises may employ equipment for receiving optical signals from the optical fibers. In PONS, the central office, or head end, transmission equipment and/or the transmission equipment located at the end user premises may, respectively, use a laser to inject data onto a fiber in a manner that may not require the use of any active components, such as amplifiers between the central office, or head end, and/or the end user premises. In other words, only passive optical components, such as splitters, optical fibers, connectors and/or splices, may be used between a service provider and an end user premises in PONS. PONS may be attractive to service providers because passive networks may be less costly to maintain and/or operate as compared to active optical networks and/or older copper based networks, such as a public switched telephone network (PSTN).

In PONS, transmission equipment may transmit signals containing voice, data and/or video over a fiber strand to the premises. An optical fiber may be split using, for example, passive optical splitters so that signals are dispersed from one fiber (the input fiber) to multiple output fibers running to, for example, user premises from a convergence point in the network. An optical fiber routed to a user's premises may be routed via a fiber drop terminal en route to the premises. At the fiber drop terminal, signals appearing on one or more optical fibers may be routed to one or more end user premises. Fiber drop terminals may be mounted in aerial applications, such as near the tops of utility poles, along multi-fiber and/or multi-conductor copper strands suspended between utility poles. Fiber drop terminals may also be installed in junction boxes mounted at ground level and/or in below-grade vaults where utilities are run below ground. Example fiber drop terminals are disclosed at U.S. Pat. No. 7,120,347; U.S. Patent Publication No. US 2005/0213921; and U.S. Patent Publication No. US 2006/0153517.

SUMMARY

Some aspects of the disclosure are directed to a management tray configured to be disposed inside a drop terminal to organize and guide optical fibers within the drop terminal.

The management tray may define an input cable anchor station, connector storage stations, a splice retention station, a fanout station, and/or a splitter retention station.

In certain implementations, the management tray defines a plurality of connector storage stations adjacent apertures aligned with drop terminal outputs. In certain examples, the storage stations are disposed in rows. In an example, the storage stations are disposed in curved rows. In an example, the connector storage stations include rails and tabs to hold the optical connectors at the stations.

In certain implementations, the management tray defines a retention station at which one or more optical components can be installed on the management tray. For example, a management insert can be installed on the tray at the retention station. In certain examples, each management insert is configured to hold two or more optical components.

In certain implementations, the management insert is configured to hold a splice. In some implementations, the management insert is configured to hold an optical splitter (e.g. a power splitter, a wavelength splitter, etc.). In other implementations, the management insert is configured to hold a fanout member. In still other implementations, the management insert defines a fanout section without a separate fanout member.

In certain implementations, the management tray defines an input cable station. In examples, input fibers can be anchored to the management tray at the input cable station. In examples, input fibers can be ribbonized at the input cable station.

In certain implementations, internal optical fibers (e.g., optical pigtails, splitter input fibers, splitter output pigtails, etc.) are routed along a guide path to take up excess fiber length. In certain examples, the internal optical fibers are routed into loops adjacent the connector storage stations.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
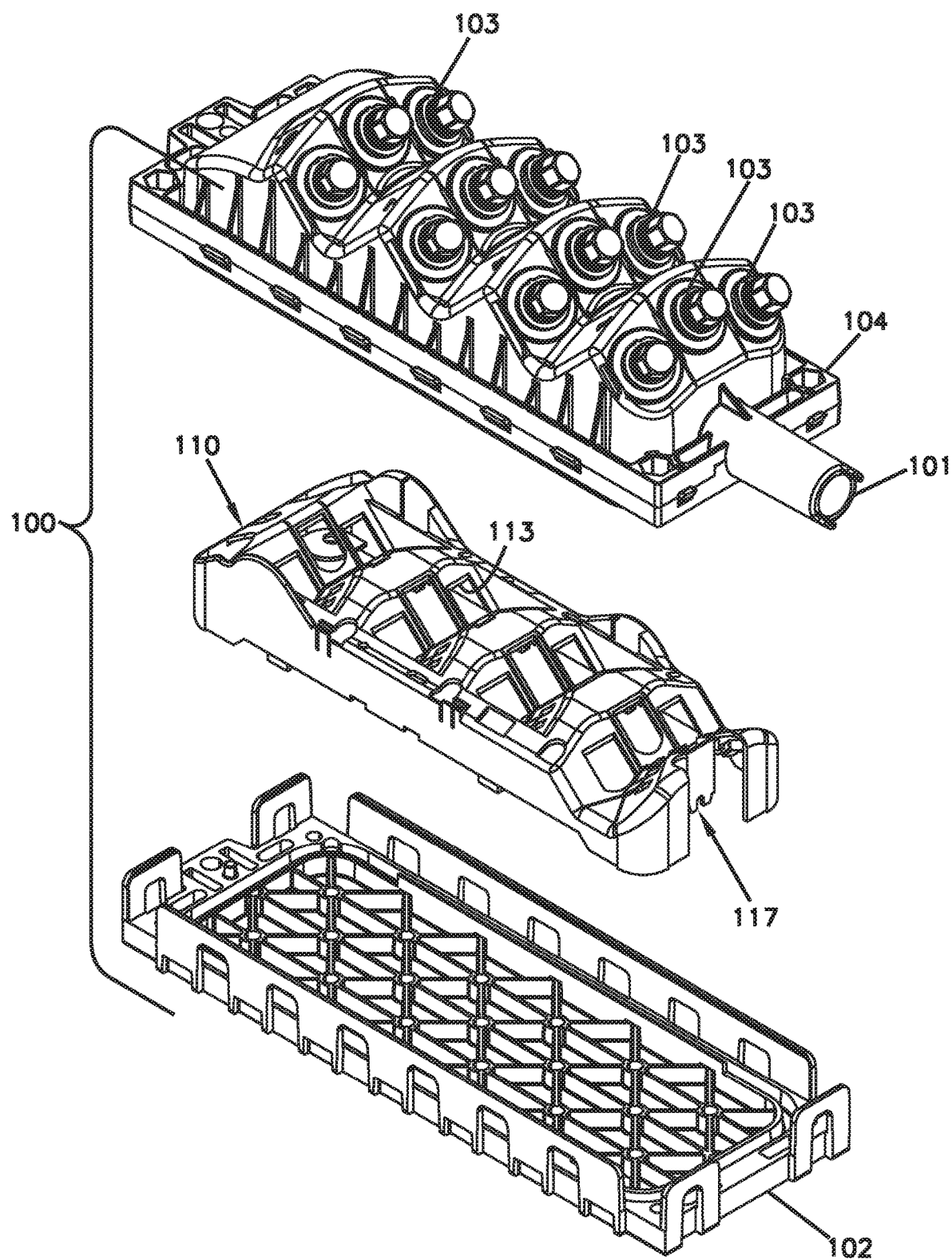
FIG. 1 is a perspective view of an example drop terminal including a base exploded away from a cover to expose a management tray therebetween.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a fiber management tray for use within a fiber optic drop terminal. The fiber management tray aids in guiding and managing optical fibers within the drop terminal. In particular, the fiber management tray may guide optical fibers from a drop terminal input to either storage stations disposed on the tray or to inner ports of drop terminal outputs. The fiber management tray may provide a retention station at which an optical splice, a fanout, and/or a passive optical splitter may be secured to the tray. A management insert may be mounted at the retention station. The fiber management tray may provide an input cable station at which an input cable can be ribbonized and/or anchored to the tray.

In general, a fiber optic drop terminal 100 includes a housing defining an interior that is environmentally sealed from an exterior of the drop terminal. The housing includes an input 101 and a plurality of outputs 103. Certain types of drop terminals 100 may include multiple inputs. A fiber optic input cable having one or more optical fibers can be received at the drop terminal input 101. In certain examples, the outputs 103 include optical adapters (preferably ruggedized optical adapters). The adapters can be single-fiber (preferably ruggedized) optical adapters and/or multi-fiber (preferably ruggedized) optical adapters.

In certain implementations, a drop terminal 100 includes a base 102 and a cover 104 that couple together to define the interior. A gasket is disposed between the base 102 and cover 104 to environmentally seal the interior of the drop terminal 100. In certain examples, the cover 104 carries the drop terminal outputs 103. In some examples, the cover 104 defines the drop terminal input 101. In other examples, the base defines the drop terminal input 101, or the base 102 and the cover 104 cooperate to define the drop terminal input. In certain examples, the drop terminal input includes an optical adapter (e.g., a ruggedized optical adapter). In an example, the optical adapter is a single-fiber (e.g., ruggedized) optical adapter. In another example, the optical adapter is a multi-fiber (e.g., ruggedized) optical adapter. In certain examples, the drop terminal input 101 includes a gland, seal, or other such structure.

In some implementations, the optical fibers of the fiber optic input cable extend through the drop terminal input 101 and into the interior of the drop terminal 100. In some such implementations, connectorized distal ends of the optical fibers are stored at storage stations, plugged into inner ports of the drop terminal outputs 103, or otherwise stored within the drop terminal 100. In other such implementations, unconnectorized distal ends of the optical fibers of the fiber optic input cable are spliced to optical pigtails disposed within the drop terminal 100. In certain examples, the unconnectorized distal ends of the optical fibers are ribbonized and optically coupled to a ribbonized end of the optical pigtails using a mass fusion splice. The optical pigtails have connectorized ends that are stored at storage stations, plugged into inner ports of the drop terminal outputs 103, or otherwise stored within the drop terminal 100. In still other implementations, a connectorized end of the optical fibers of the fiber optic input cable is plugged into an exteriorly accessible input port of the drop terminal and thereby optically coupled to a connectorized end of the optical pigtails located within the drop terminal 100.

Example drop terminal bases and covers suitable for use with the fiber management tray disclosed herein are shown and described in U.S. Pat. Nos. 7,489,849 and 7,292,763, the disclosure of which is hereby incorporated herein by reference.

Figure 2:
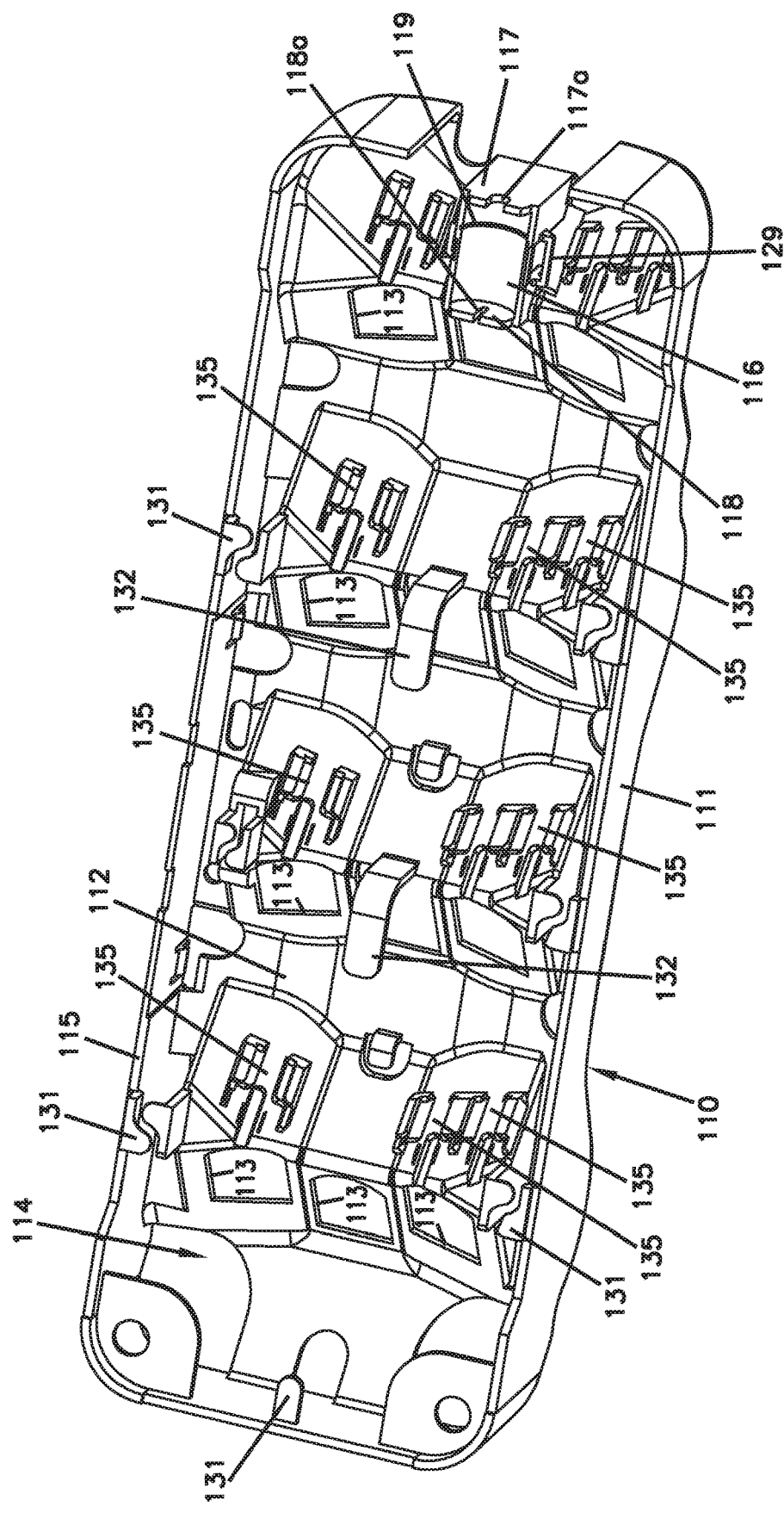
FIG. 2 is a perspective plan view of an example management tray of FIG. 1.
Figure 3:
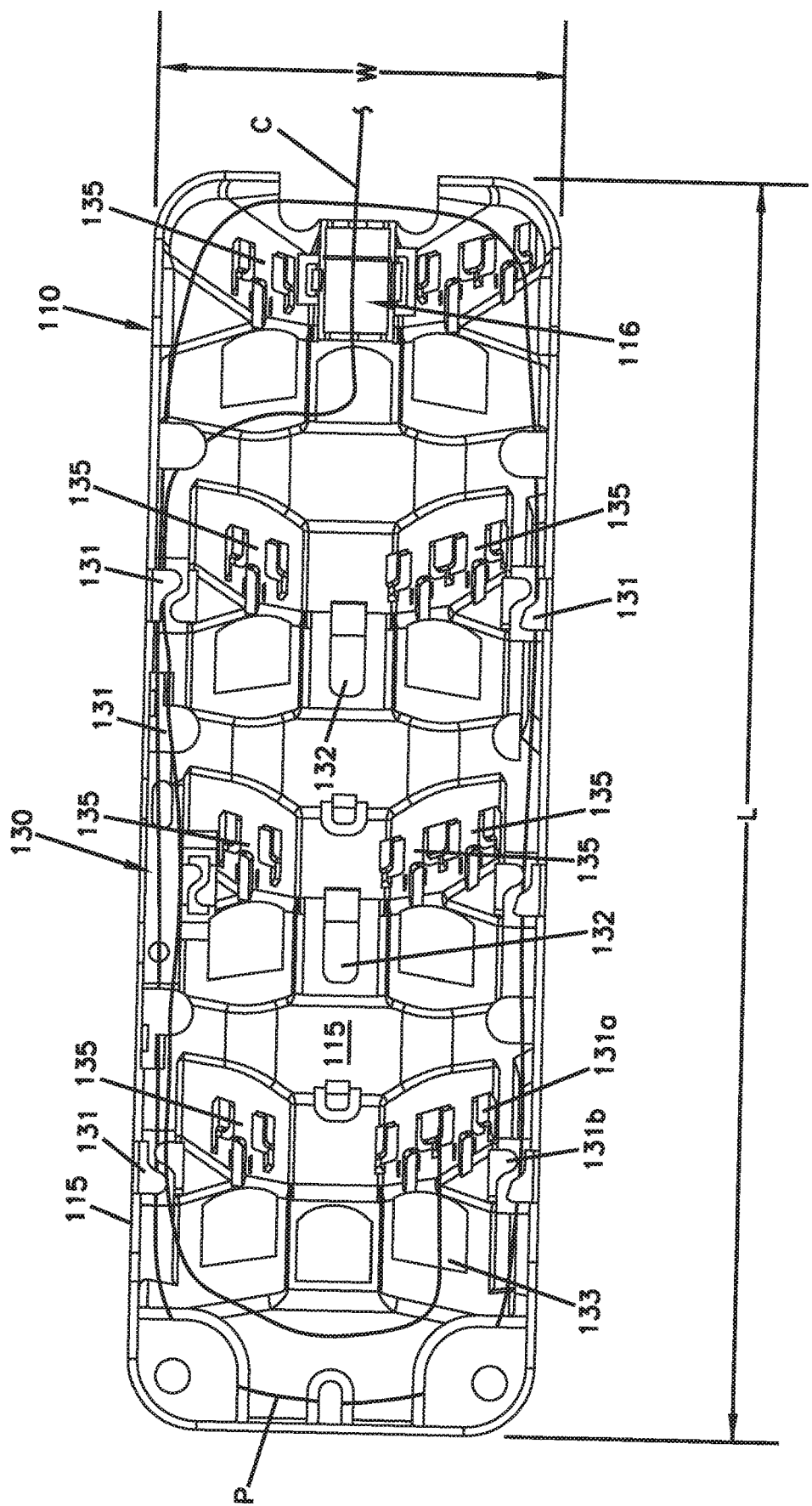
FIG. 3 is a plan view of the management tray of FIG. 2.

An example fiber management tray 110 is shown in FIGS. 1-3. The fiber management tray 110 has a length L (FIG. 3) that extends substantially (e.g., at least half, at least three-quarters, at least 80%, or at least 90%) along a length of the drop terminal 100. The fiber management tray 110 has a width W (FIG. 3) that extends substantially (e.g., at least half, at least three-quarters, at least 80%, or at least 90%) along a width of the drop terminal 100.

The fiber management tray 110 defines apertures 113 that align with inner ports of the drop terminal outputs 103. Accordingly, connectorized ends of the input cable C (FIG. 3) or connectorized ends of the optical pigtails disposed within the drop terminal 100 can be inserted through the apertures 113 to be plugged into the inner ports.

The fiber management tray 110 includes a peripheral sidewall 111 extending upwardly from a management surface 112. The peripheral sidewall 111 and the management surface 112 cooperate to define an interior 114 accessible through an open side 115 (see FIG. 2). In certain examples, the management surface 112 defines the apertures 113. In certain implementations, the apertures 113 are angled relative to the open top 115. In certain examples, the drop terminal outputs 103 are angled relative to the drop terminal input 101 and the apertures 113 are angled relative to the drop terminal input 101 to generally the same degree as the drop terminal outputs 103.

In some implementations, each drop terminal output 103 has a corresponding aperture 113. In other implementations, a group of two or more drop terminal outputs 103 have a corresponding aperture 113. In certain implementations, the apertures 113 are aligned in rows. In certain examples, the apertures 113 are aligned in curved rows.

In accordance with aspects of the disclosure, the fiber management tray 110 includes an input cable station 116. The input cable station 116 is aligns with the drop terminal input 101 when the fiber management tray 110 is disposed between the base 102 and the cover 104. The input cable station 116 can be bounded between walls 117, 118. Each of the walls 117, 118 defines a slot or aperture 117a, 118a that allows the optical fibers of the input cable C to extend through the input cable station 116. The slot 117a is located closer to the drop terminal input 101 than the slot 118a. In an example, the slot 118a is narrower than the slot 117a.

In certain implementations, the input cable C is anchored (e.g., using adhesive) to the fiber management tray 110 at the input cable station 116. For example, the walls 117, 118 bound a region in which adhesive (e.g., epoxy) can be injected over a section of the input cable C. A cover 120 (FIG. 4) can enclose the input cable station 116 to hold the adhesive at the station 116. For example, the cover 120 can be latched at the input cable station 116. The cover 120 defines an injection opening 127 through which the adhesive can be injected into the input cable station 116.

Figure 4:
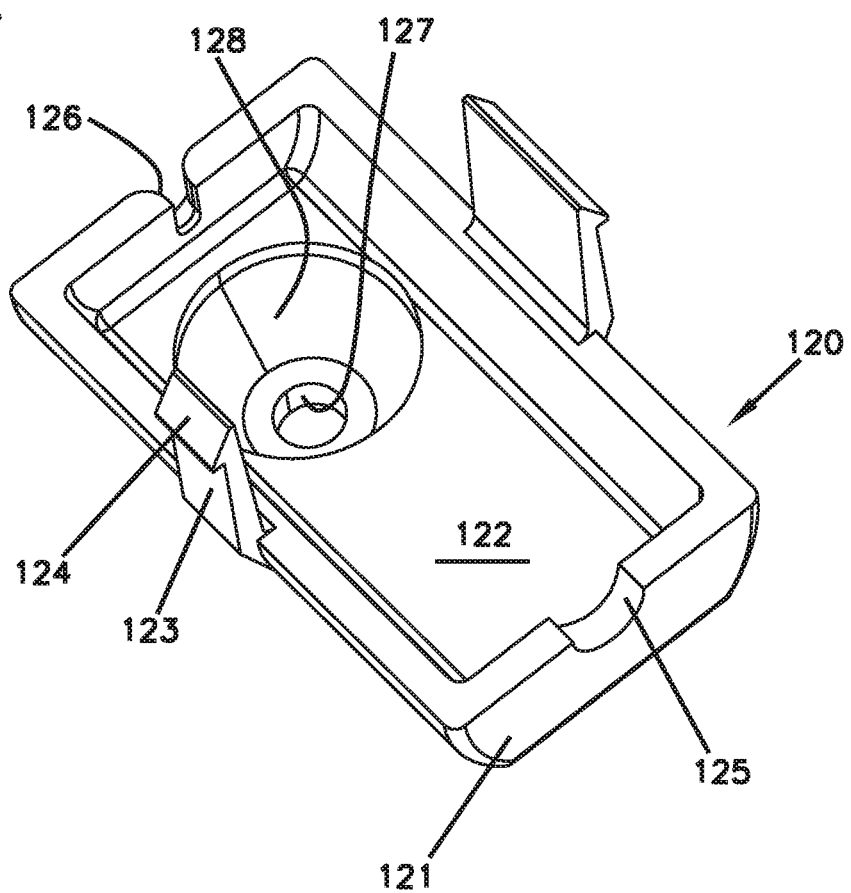
FIG. 4 is a perspective view of a cable input station cover suitable for use with the management tray of FIG. 2.

FIG. 4 illustrates an example cover 120. The cover 120 includes a peripheral sidewall 121 extending from a cover surface 122. Resilient latch arms 123 extend from the peripheral wall 121 and terminate in hooks 124. Cable slots or apertures 125, 126 are defined at opposite ends of the peripheral wall 121. The cover surface 122 defines the injection opening 127. In certain examples, the cover surface 122 defines a frustro-conical shaped cavity 128 that leads to the injection opening 127 (see FIG. 4).

When the cover 120 is mounted at the input cable station 116, the cover 120 and the input cable station 116 cooperate to define an interior in which the adhesive can be injected. The latch arms 123 latch to mounting members 129 at the input cable station 116 to hold the cover 120 securely thereto. In an example, the cable slot 125 aligns with the cable slot 117a and the cable slot 126 aligns with the cable slot 118a to form cable apertures when the cover 120 is mounted at the input cable station 116. In certain examples, the formed cable apertures aid in holding the input cable C in place.

In certain implementations, the optical fibers of the input cable C are ribbonized at the input cable station 117. For example, loose fibers of the input cable C may enter the input cable station 116 through the slot 117a. The fibers are ribbonized and routed through the narrower slot 118a. In certain example, the ribbonized cable or loose fibers can be wrapped at the narrower slot 118a to aid in axially retaining the ribbonized cable or fibers in place. Mounting the cover 120 closes the slots 117a, 118a to aid in axially and laterally retaining the ribbonized cable or fibers at the input cable station 116.

The ribbonized cable is optically spliced (e.g., via a mass fusion splice) to a ribbonized end of a plurality of optical pigtails P. The splice is protected by a smouv, which is retained at the tray as will be discussed in more detail herein with respect to FIGS. 6-14. Opposite ends of the optical pigtails P are connectorized.

In accordance with other aspects of the disclosure, the fiber management tray 100 guides optical fiber pigtails P or connectorized optical fibers of the input cable C around a guide path 130 to store excess length of the optical fibers in a loop, to maintain organization of the pigtails P, and/or to inhibit bending of the pigtails P beyond a minimum bend radius of the pigtails P (see FIG. 3). In certain examples, the guide path 130 extends along an inner perimeter of the sidewall 111. The guide path 130 also may extend in loops 133 around one or more apertures 113. For example, the guide path 130 may define a loop 133 around each row of apertures 113. Looping the pigtails P allows the connectorized ends of the pigtails P to be routed to the apertures 113 or storage stations 113 without overbending the pigtails P. Of course, if the optical fibers of the input cable C are connectorized instead of ribbonized and spliced, then the optical fibers would be routed along the guide path 130 and loops 133.

In certain implementations, the tray 100 includes guide members 131 that define a routing passage around the inner perimeter. In certain examples, the guide members 131 include pairs of retention tabs that define a slot therebetween through which the optical fibers are routed. In examples, the retention tabs 131 define tunnels through which the optical fibers are routed (e.g., see FIG. 6). In an example, the retention tabs 131 are symmetrical. In another example, a pair of retention tabs 131 includes a first tab 131a having a first shape and a second tab 131b having a second shape that is different from the first shape. The asymmetrical tabs 131a, 131b of the pair provide a larger gap through which the optical fibers can be inserted compared to the gap provided by a symmetrical pair.

Loop retention tabs 132 are disposed on the management surface 112 to aid in retaining and/or organizing the fiber loops 133. In the example shown, two loop retention tabs 132 are disposed along a central longitudinal axis of the management tray 110. In other examples, a larger or smaller number of loop retention tabs 132 can be utilized. In the example shown, each loop retention tab 132 has an open end facing away from the input cable station 116. In the example shown, the loop retention tabs 132 are L-shaped or elbow shaped.

In accordance with certain aspects of the disclosure, the fiber management tray 110 defines one or more storage stations 135 at which connectorized ends of the input cable C or connectorized ends of optical pigtails P can be temporarily stored prior to being inserted into the inner ports of the drop terminal outputs 103. In certain implementations, each connectorized end is stored at a respective storage station 135. In some implementations, each storage station 135 holds the connectorized end of one optical fiber. In other implementations, each storage station 135 holds the connectorized ends of a plurality of optical fibers.

Figure 5:
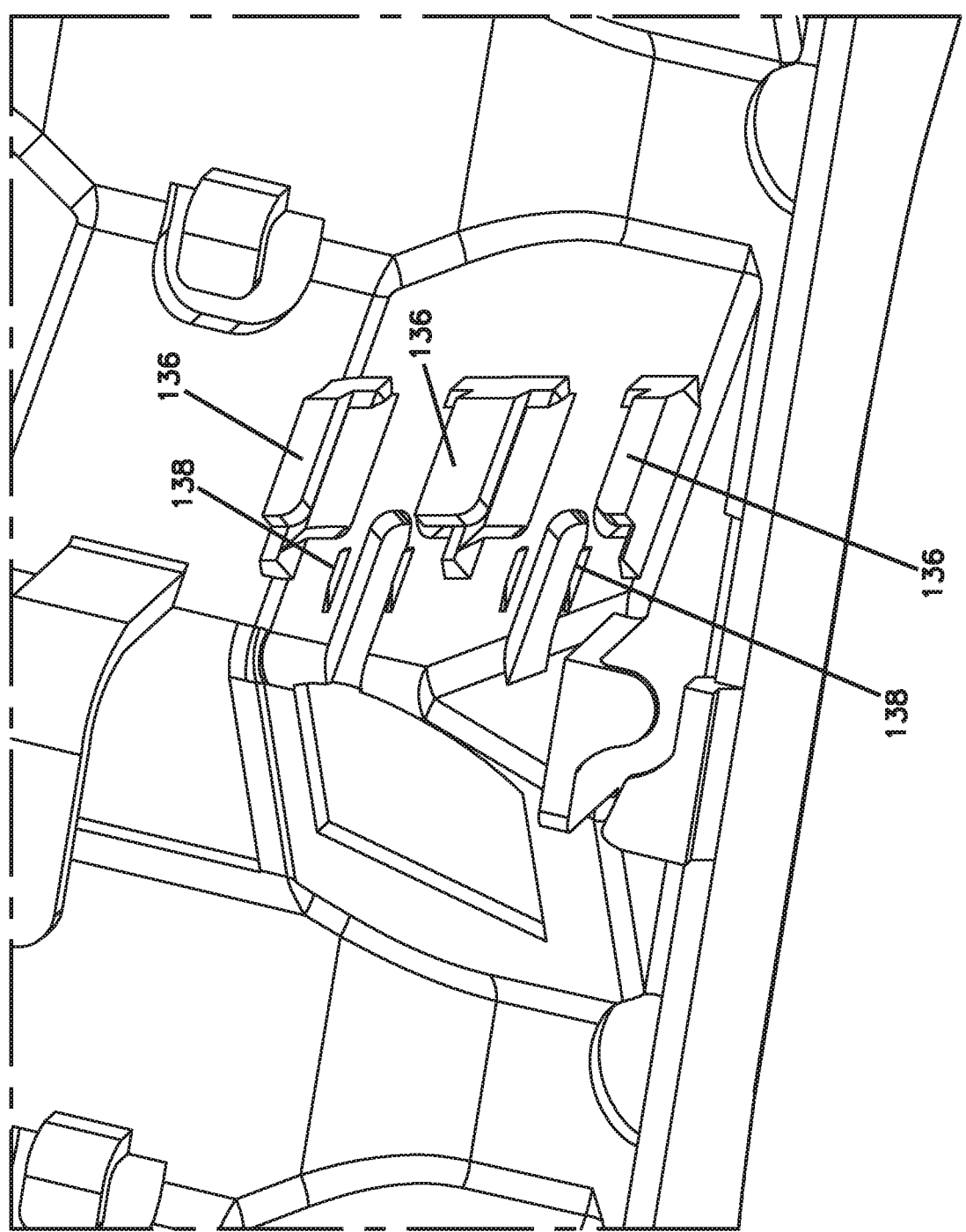
FIG. 5 is an enlarged view of a portion of FIG. 2.
Figure 6:
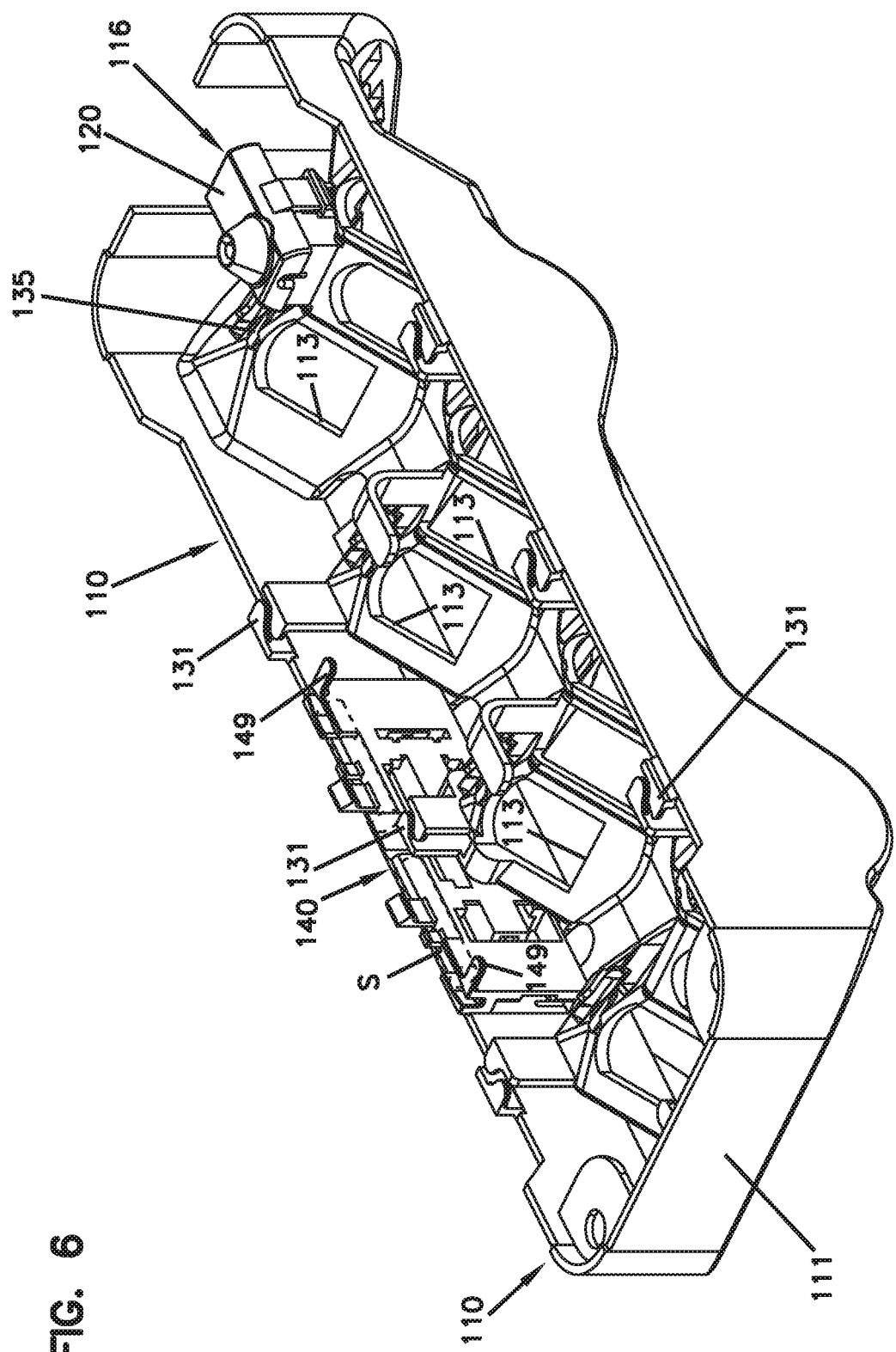
FIG. 6 is a perspective view of the example management tray of FIG. 2 with a first example management insert installed.
Figure 7:
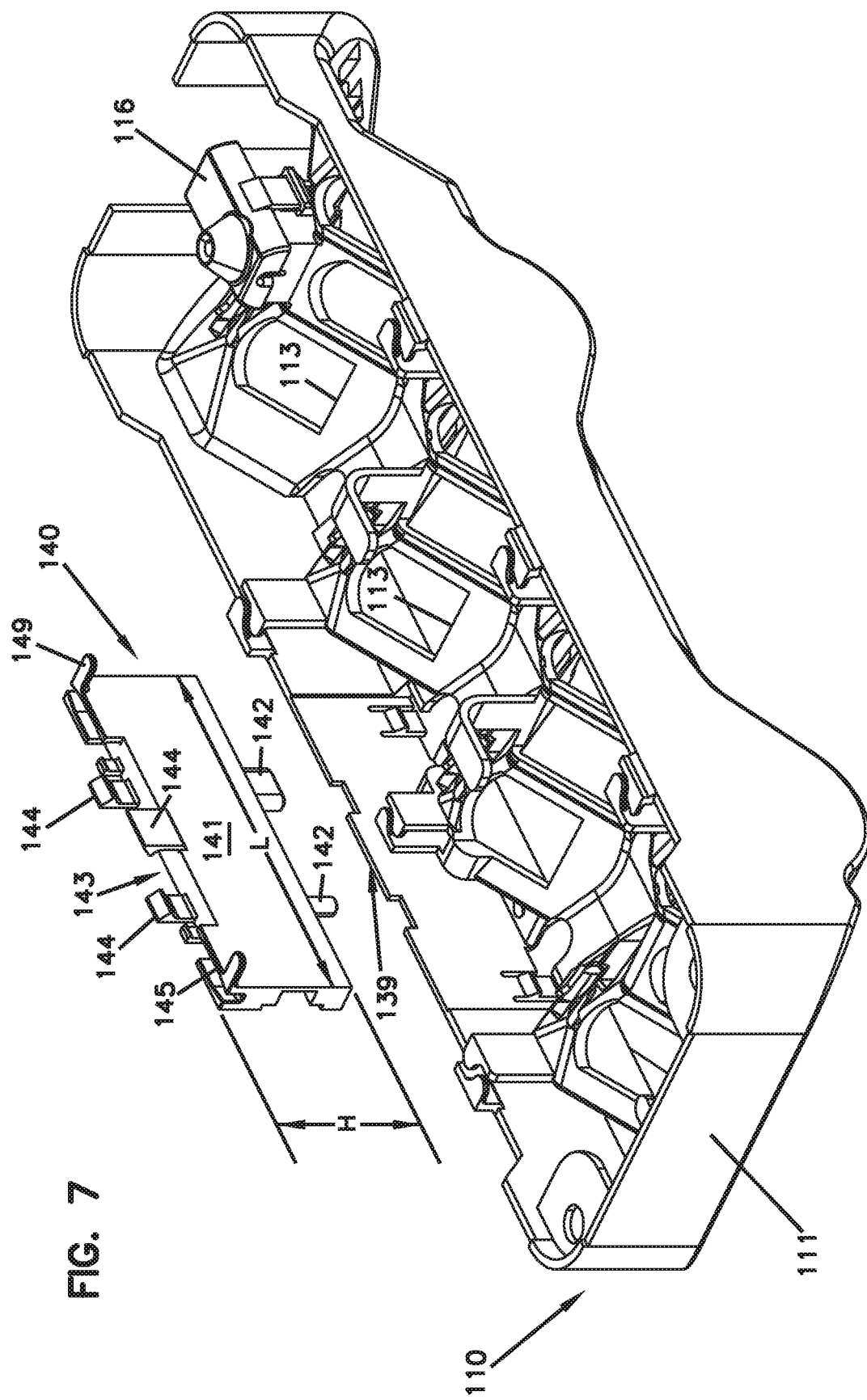
FIG. 7 is a first side perspective view of the management tray of FIG. 6 with the management insert exploded away from the tray.

The storage stations 135 are disposed at the apertures 113. In certain implementations, each storage station 135 includes a first portion that latches or otherwise inhibits lateral movement of the optical connector in a first direction D1 and a second portion that inhibits axial movement of the optical connector in a second direction D2. In certain examples, the first portion includes rails 136 and the second portion includes one or more tabs 138 (see FIG. 5). The rails 136 slide over a grip housing or other section of a plug connector to retain the plug connector at the respective storage station 135. The grip housing or another section of the plug connector snaps over the tab(s) 138, which inhibits the plug connector from sliding away from the rails 136. In other examples, the storage station 135 can include latch arms, a press-fit aperture, or any other securement mechanism.

Example storage stations suitable for use on the tray 110 are shown in PCT Appl. No. PCT/EP2017/056847, filed Mar. 22, 2017, titled "Module and Enclosure for Use Therein, the disclosure of which is hereby incorporated herein by reference.

In accordance with other aspects of the disclosure, the fiber management tray 100 defines a retention station 139 at which optical equipment can be stored. For example, an optical splice S and protector thereon (e.g., a smouv), a passive optical splitter, a wave division multiplexer (WDM), and/or a fanout 170 can be stored at the retention station 139. In certain implementations, the optical equipment (e.g., the splice, the splitter, the WDM, and/or the fanout) is mounted to a cable management insert 140, 150, 160 which is removably coupled to the tray 110 at the retention station 139.

In certain examples, the management insert 140, 150, 160 can hold two or more pieces of optical equipment. In certain examples, the management insert 140, 150, 160 is latched to the tray 110. In certain examples, the management insert 140, 150, 160 is held to the tray 110 by the drop terminal 100 (e.g., by the base of the drop terminal 100). In certain examples, the management insert 140, 150, 160 is disposed along the inner periphery of the sidewall 111 to facilitate routing fibers between the guide path 130 and the management insert 140, 150, 160.

In certain implementations, the management insert 140, 150, 160 includes one or more legs 142, 152, 162 that fit through respective apertures defined in the tray 110 to hold the management insert 140, 150, 160 in position relative to the tray 110. In an example, the management insert 140, 150, 160 has two legs 142, 152, 162 of different sizes and/or shapes so that the management insert 140, 150, 160 only fits with the management tray 110 in a single orientation. For example, the management insert 140, 150, 160 can be configured to receive an input (e.g., a fiber ribbon, a splitter input, etc.) from the end that faces the input cable station 116 of the management tray 110 and to direct an output (e.g., fanned out fibers, split fibers, etc.) away from the input cable station 116.

The management insert 140, 150, 160 includes a main body 141, 151, 161 from which the legs 142, 152, 162 extend. The main body 141, 151, 161 has a length L' extending between opposite ends, a height H extending between opposite sides, and a depth D extending between an interior side and a wall side. The length L' is larger than the height H, which is larger than the depth D.

The main body 141, 151, 161 defines a splice retention region 143, 153, 163. A smouv or other splice protector can be mounted at the splice retention region 143, 153, 163 so that the splice is carried with the management insert 140, 150, 160. In certain examples, latch arms 144, 154, 164 extend outwardly from one of the opposite sides of the main body 141, 151, 161 to hold a smouv or other splice protector.

In an example, the latch arms 144, 154, 164 extend extending outwardly from a first side and the legs 142, 152, 162 extend outwardly from an opposite second side. In certain examples, the first side defines a channel 145, 155, 165 in which the smouv or other splice protector is disposed (e.g., see FIGS. 6, 11, and 14).

Figure 8:
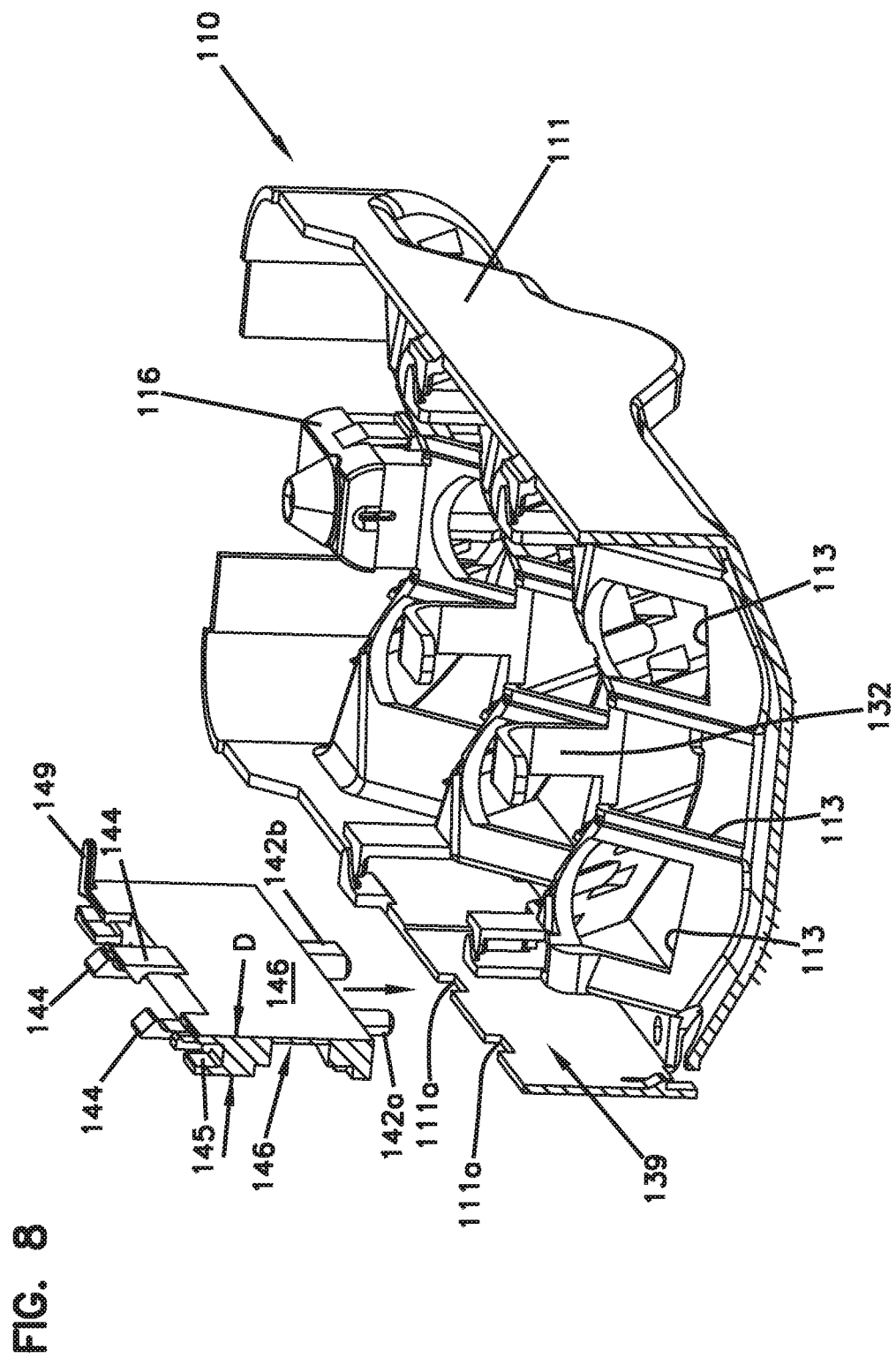
FIG. 8 is a cross-sectional view of the management tray and management insert of FIG. 7.
Figure 11:
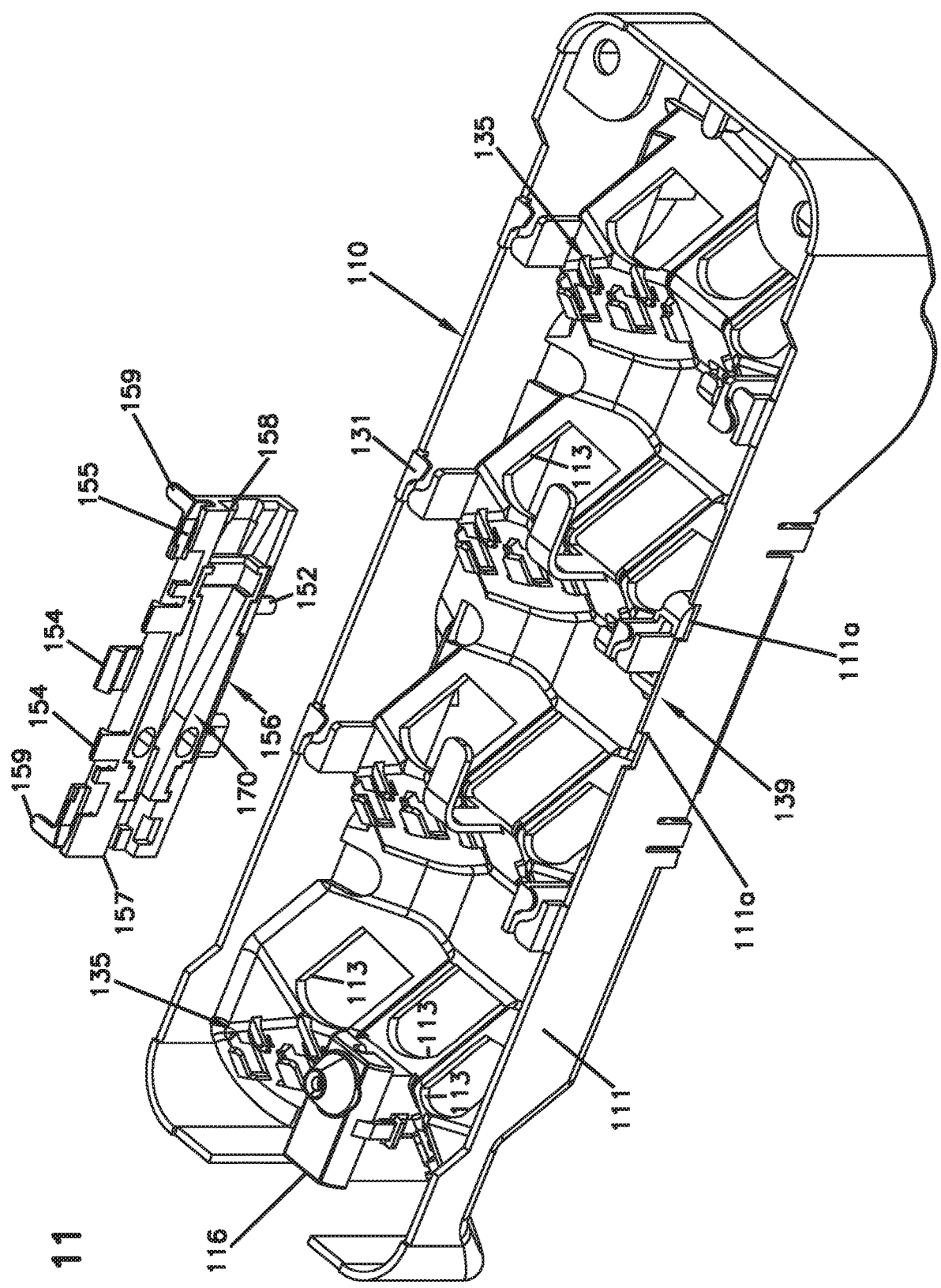
FIG. 11 is a perspective view of the example management tray of FIG. 2 with the second management insert exploded away from the tray.
Figure 14:
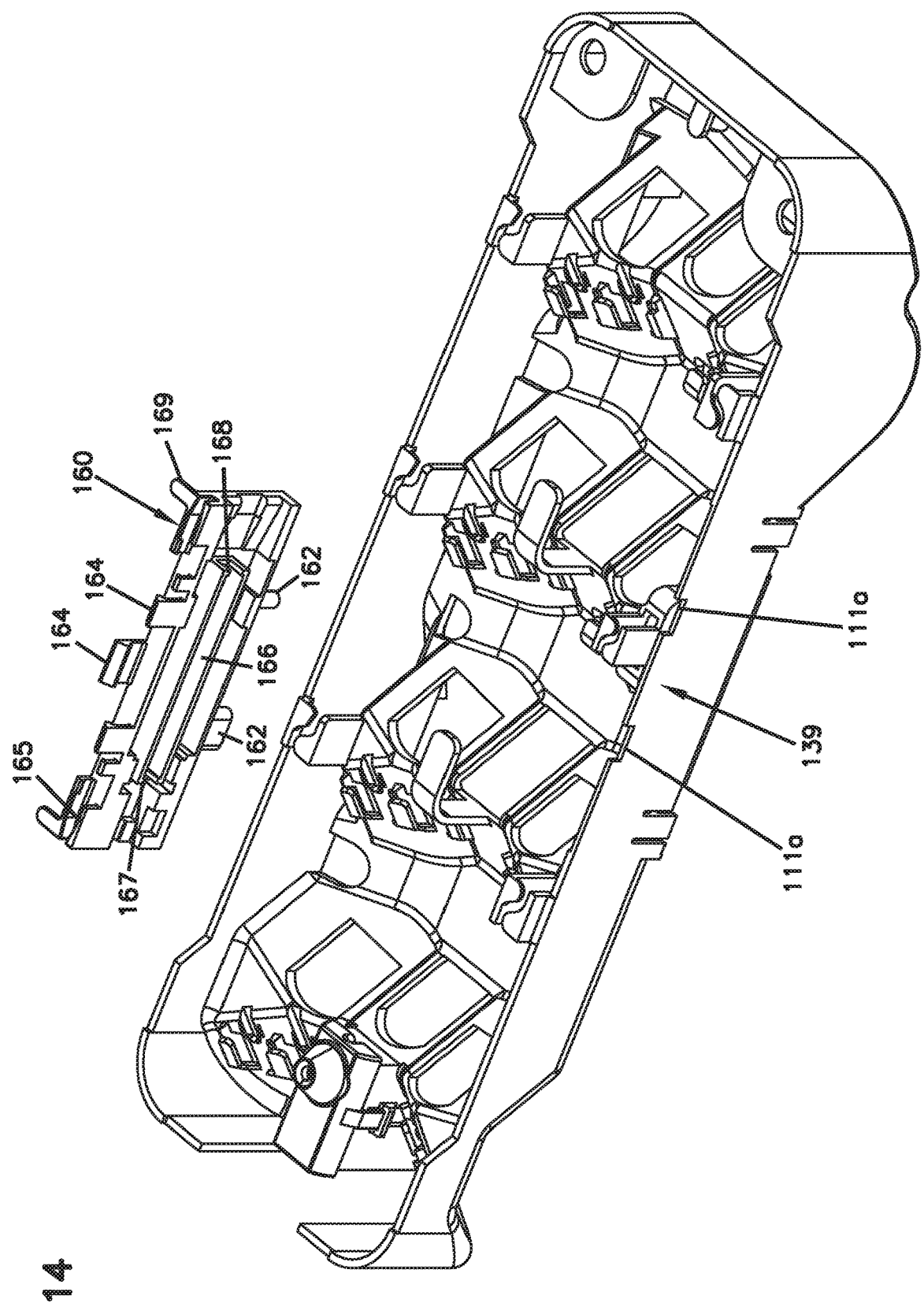
FIG. 14 is a perspective view of the example management tray of FIG. 2 with the third management insert exploded away from the tray.

In certain examples, the sidewall 111 of the management tray 110 defines one or more cutouts 111a aligned with one or more of the latch arms 144, 154, 164 to facilitate loading of the splice protector at the splice retention region 143, 154, 163 (e.g., see FIGS. 8, 11, and 14). The cutouts 111a provide space into which the latch arms 144, 154, 164 can deflect when the splice protector is inserted between the latch arms 144, 154, 164.

In certain examples, one or more retention fingers 149, 159, 169 extend outwardly from the main body 141, 151, 161 to further guide optical fibers around the management insert 140, 150, 160 when the management insert 140, 150, 160 is installed at the management tray 110. In certain examples, the retention fingers 140, 150, 160 extend from the first side of the main body 141, 151, 161 towards the interior 114 of the tray 110. In the example shown, the main body 141, 151, 161 includes retention fingers 149, 159, 169 at opposite ends of the main body 141, 151, 161.

Figure 9:
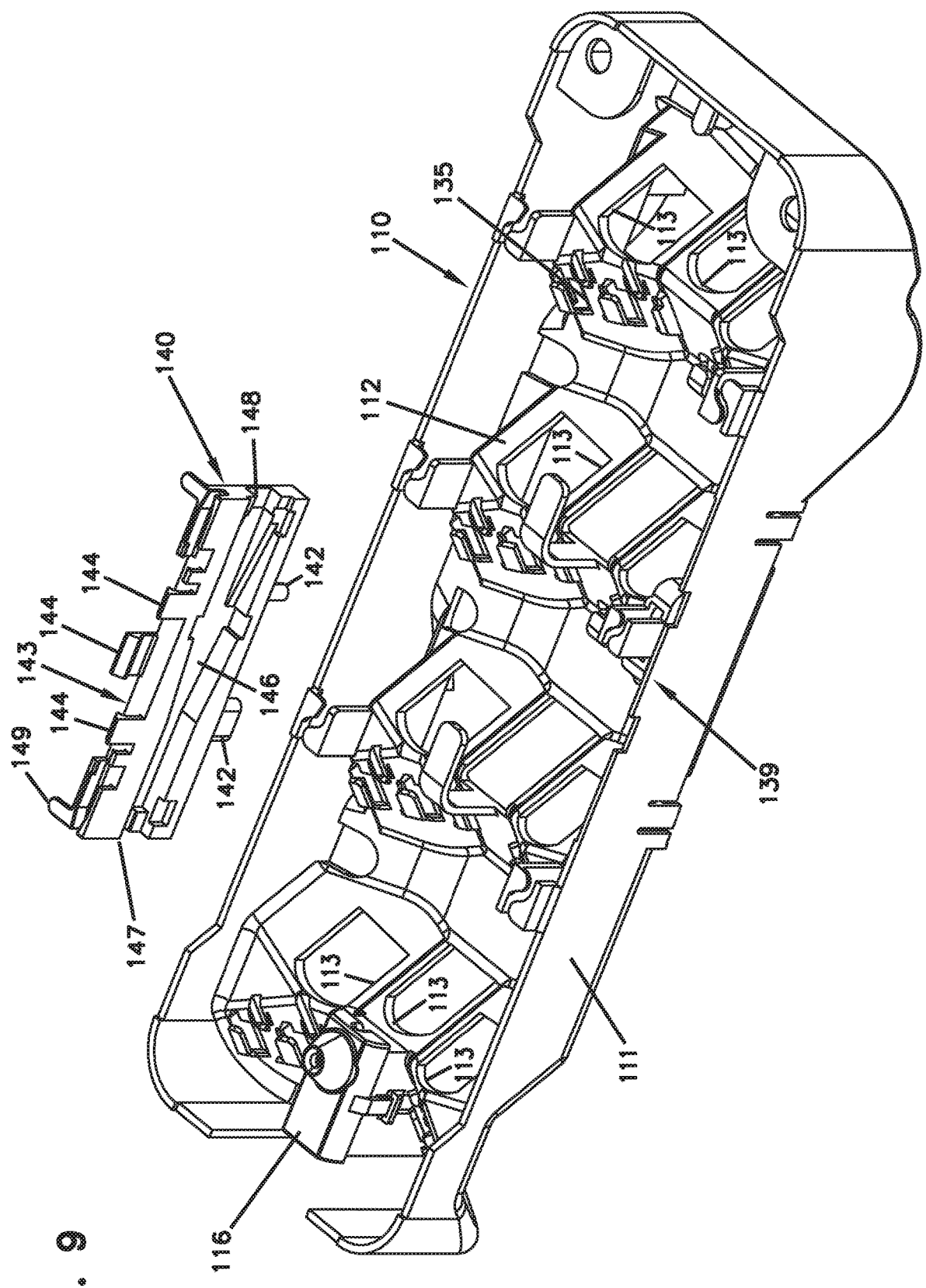
FIG. 9 is an opposite second side perspective view of the management tray and management insert of FIG. 7.

FIGS. 6-9 illustrate a first example management insert 140 configured in accordance with the principles of the present disclosure. As shown in FIG. 9, the main body 141 defines a fanout region 146. In certain examples, the fanout region 146 is defined on the wall side of the main body 141. In other examples, the fanout region 146 could be formed on the interior side of the main body 141. A fiber ribbon enters a first end 147 of the fanout region 146 and is separated into individual fibers within the fanout region 146. Individual fibers leave the second end 148 of the fanout region 146. Cable ties, adhesive, or other such mechanisms can be used to hold the fibers at the fanout region 146.

Figure 10:
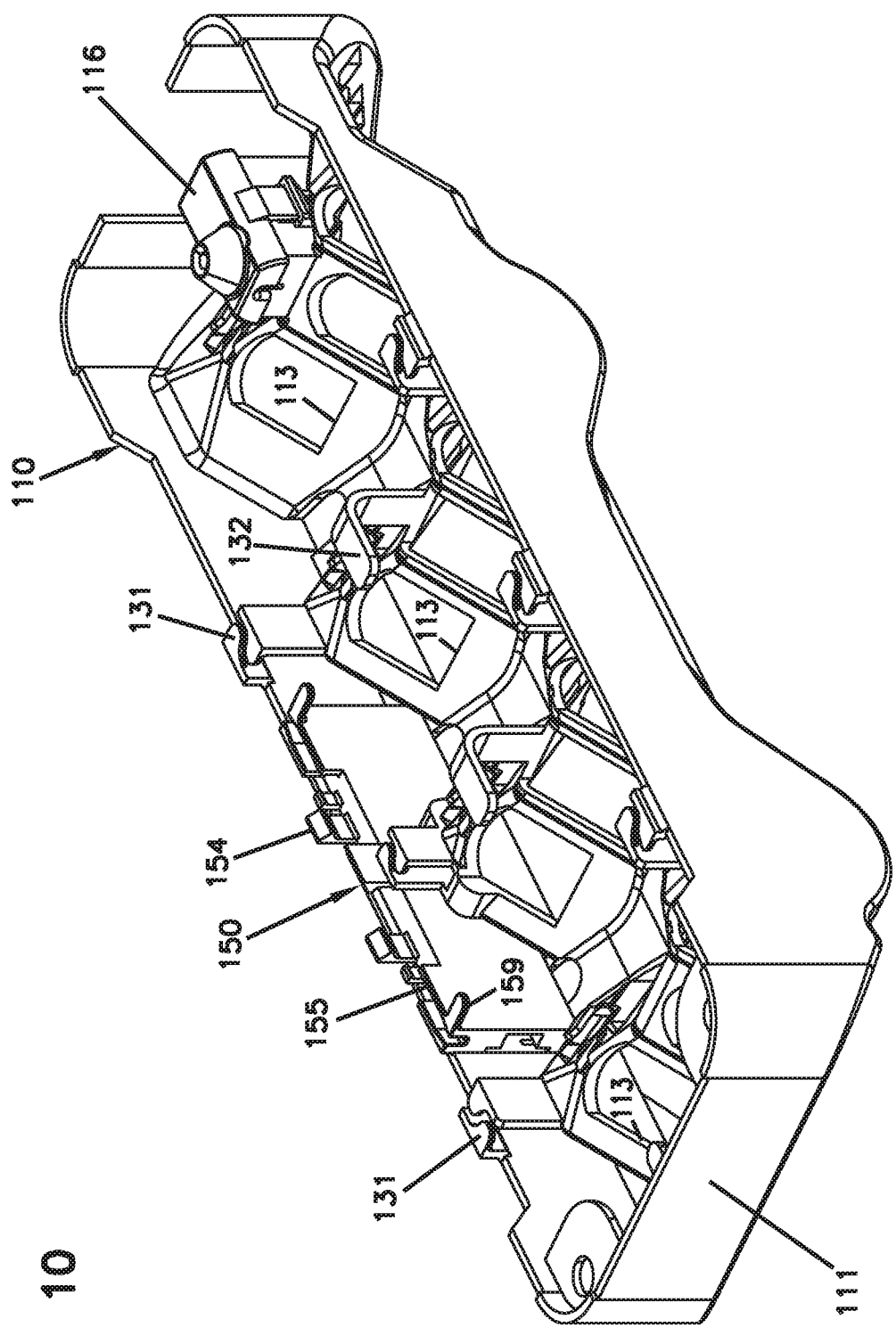
FIG. 10 is a perspective view of the example management tray of FIG. 2 with a second example management insert installed.
Figure 12:
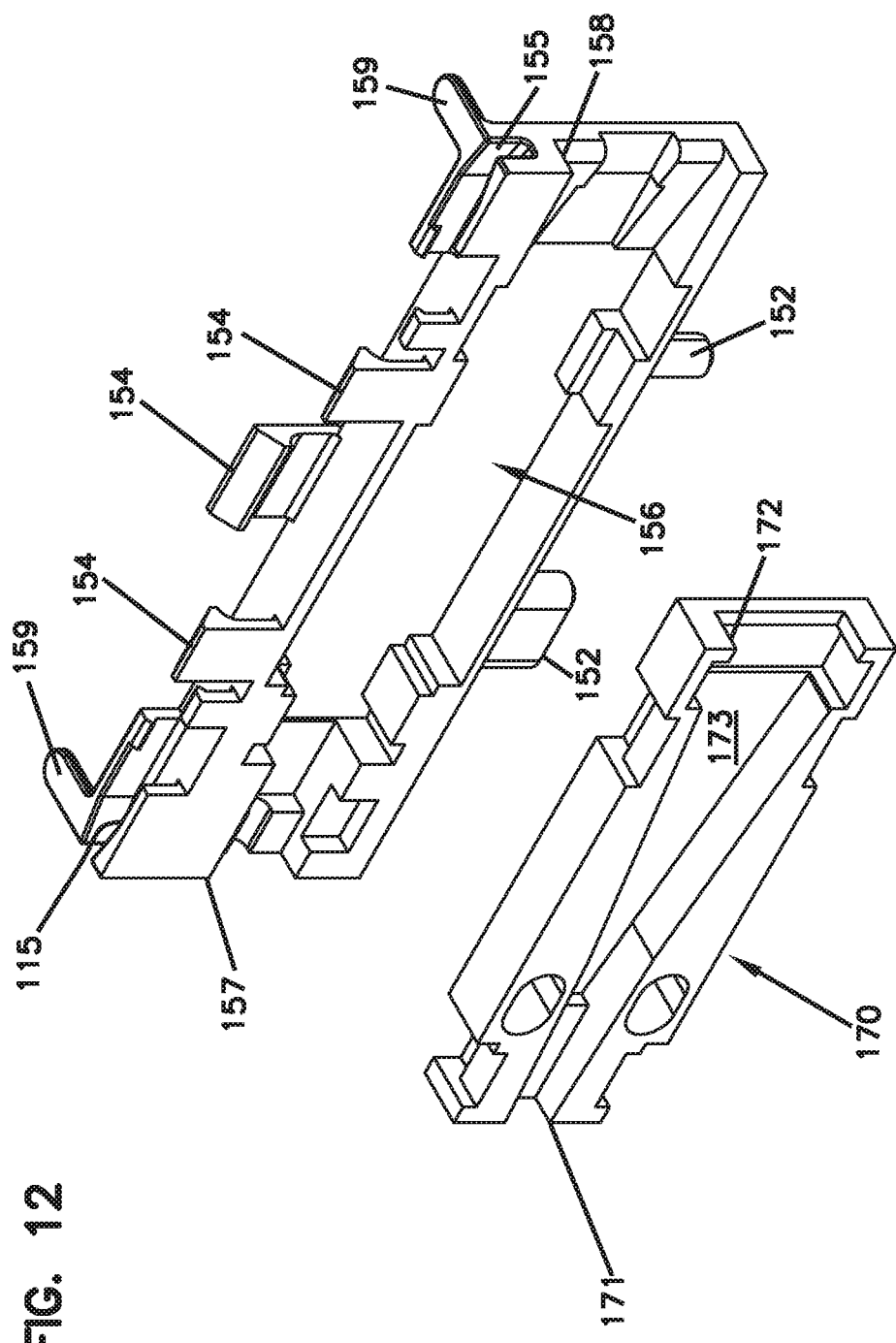
FIG. 12 is a perspective view of the second management insert with a fanout member exploded away from the insert.

FIGS. 10-12 illustrate a second example management insert 150 configured in accordance with the principles of the present disclosure. As shown in FIG. 11, the main body 151 defines a fanout region 156. In certain examples, the fanout region 156 is defined on the wall side of the main body 151. In other examples, the fanout region 156 could be formed on the interior side of the main body 141. A separate fanout member 170 is coupled to the main body 151 at the fanout region 156. A fiber ribbon enters a first end 157 of the fanout region 156 and is separated into individual fibers at the fanout member 170. Individual fibers leave the second end 158 of the fanout region 156.

FIG. 12 illustrates an example fanout member 170 exploded away from the fanout region 156 of the management insert 150. The fanout member 170 has a first end 171 sized to receive a fiber ribbon and a second end 172 sized to enable multiple, separate optical fibers to extend therethrough. The fanout member 170 and/or the fanout region 156 may be sized and/or shaped so that the fanout member 170 can be received at the fanout region 156 in only a single orientation.

Figure 13:
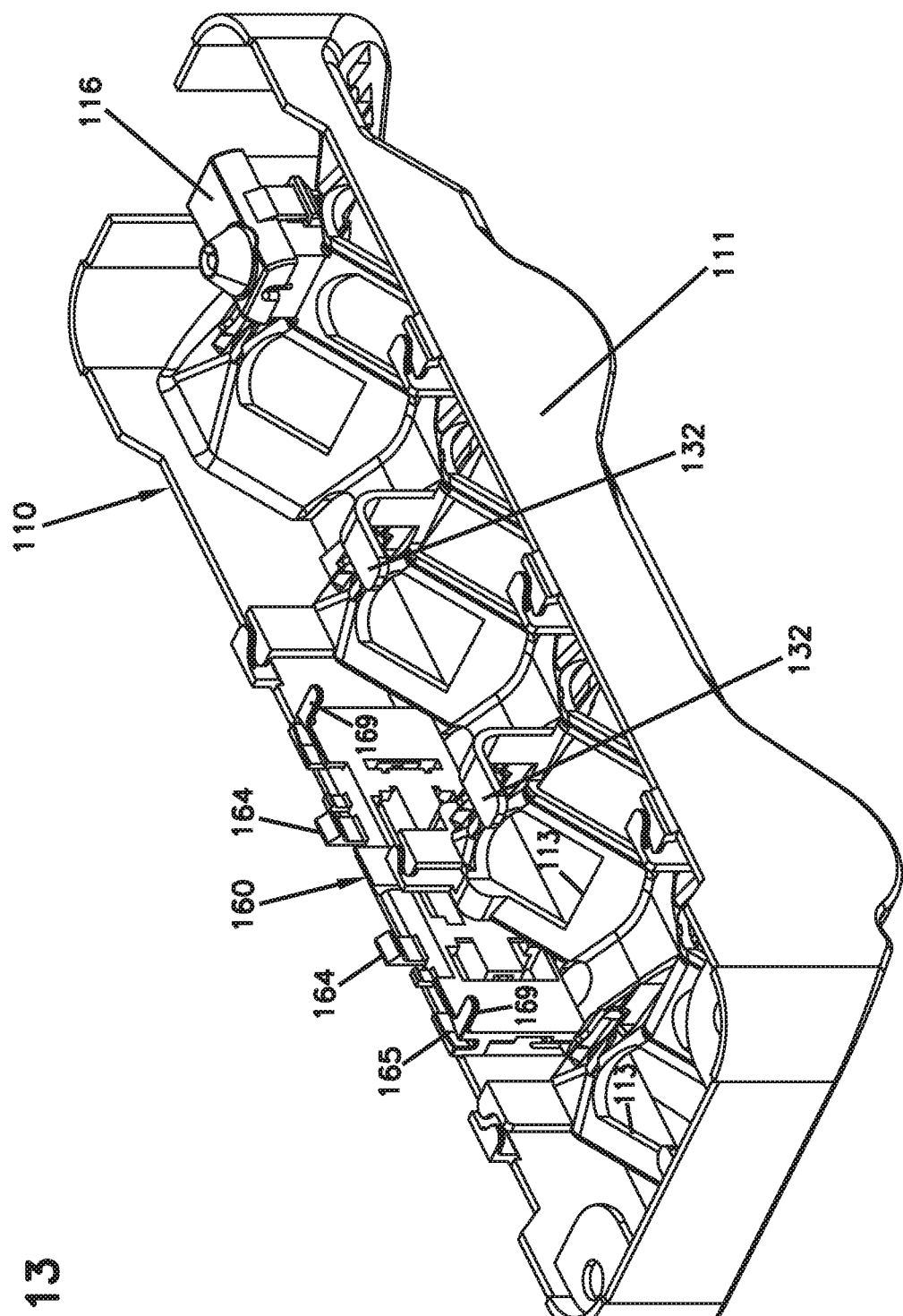
FIG. 13 is a perspective view of the example management tray of FIG. 2 with a third example management insert installed.

FIGS. 13-14 illustrate a third example management insert 160 configured in accordance with the principles of the present disclosure. As shown in FIG. 14, the main body 161 defines a splitter region 166. In certain examples, the splitter region 166 is defined on the wall side of the main body 161. In other examples, the splitter region 166 could be formed on the interior side of the main body 161. An optical splitter (e.g. a passive optical power splitter, a wave division multiplexer, etc.) can be loaded at the splitter region 166 so that the optical splitter is carried by the management insert 160.

One or more input optical fibers enter a first end 167 of the splitter region 166 and optically couple to the optical splitter. The optical splitter splits optical signals carried over the input fibers onto a plurality of output fibers. The output fibers leave the splitter and extend through a second end 168 of the splitter region 166.

As discussed, the management tray 110 described above can be utilized with various cable input configurations. In a first configuration, multiple optical fibers of an input cable C enter the drop terminal input 101 and are optically coupled to respective optical pigtails P at an optical splice S (e.g., a mass fusion splice). A splice protector (e.g., a smouv) is disposed over the optical splice S. The splice protector is coupled to the management insert 140, 150, which is mounted to the management tray 110. In certain examples, excess length of the ribbonized input cable C or ribbonized section of the pigtails P is routed along the guide path 130 (e.g., around the inner perimeter of the tray 110).

The ribbonized section of the pigtails P is broken out into individual pigtails at the fanout section 146, 156 of the management insert 140, 150. Excess length of the separated pigtails P also can be routed along the guide path 130. Connectorized ends of the pigtails P are routed to the storage stations 135 on the tray 110. In certain examples, the pigtails may be looped around the storage stations 135 and/or the apertures 113 leading to the drop terminal outputs 103.

In certain examples, the optical fibers of the input cable C are ribbonized at the input cable station 116. Part of the ribbonized section of the fibers may be anchored at the input cable station 116 (e.g., using epoxy). In certain examples, foam or other material may be wrapped about the ribbonized section at the slot 118*a* to aid in axially retaining the ribbonized section at the input cable station 116.

In another configuration, one or more optical fibers of the input cable C enter the drop terminal 100 at the drop terminal input 101 and are optically coupled to a splitter disposed at the management insert 160. In some examples, the one or more optical fibers may be spliced to pre-cabled splitter input fibers. In other examples, the one or more optical fibers may be otherwise optically coupled to the splitter. Two or more output pigtails of the splitter can be managed the same as the individual pigtails P leaving the management insert 140, 150 in the first configuration. In certain implementations, the one or more optical fibers of the input cable C may be anchored to the tray 110 at the input cable station 116.

In yet another configuration, one or more optical fibers of the input cable C can have connectorized ends. Such optical fibers can enter the drop terminal 100 through the drop terminal input 101 and enter the management tray 110. Such optical fibers may be routed along the guide path 130 and to the storage stations 135. In certain implementations, the one or more optical fibers of the input cable C may be anchored to the tray 110 at the input cable station 116. In certain examples, connectorized optical fibers of the input cable C may bypass a management insert. In other examples, a management insert is not installed.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A drop terminal comprising:
    a housing defining an interior, the housing having an input and a plurality of output ports; and
    a tray configured to be disposed within the interior of the housing, the tray including a tray body that extends substantially a length of the housing and substantially a width of the housing, the tray body defining a plurality of apertures providing access to the output ports of the housing, the tray body including fiber management guides to route optical fibers of an optical cable about the tray, the tray body also including a storage arrangement configured to retain one or more optical connectors at the tray body.

2. The drop terminal of claim 1, wherein the storage arrangement separately retains each of the optical connectors.

3. The drop terminal of claim 1, wherein the storage arrangement retains the optical connectors at storage positions adjacent the apertures.

4. The drop terminal of claim 3, wherein the tray body defines rows of the apertures; and wherein each row has a plurality of the storage positions.

5. The drop terminal of claim 1, wherein each storage arrangement includes one or more connector holders.

6. The drop terminal of claim 5, wherein each connector holder is monolithically formed with the tray body.

7. The drop terminal of claim 5, wherein each connector holder includes rails and a stop member.

8. The drop terminal of claim 1, wherein the output ports of the housing are angled relative to the input; and wherein the apertures defined by the tray body are angled to align with the output ports.

9. The drop terminal of claim 1, wherein the tray body includes an input cable station.

10. The drop terminal of claim 9, wherein a cover attaches to an anchor base at the input cable station to define a potting region.

11. The drop terminal of claim 1, further comprising the optical cable extending from a first end to a second end, the optical cable including the optical fibers, the optical fibers being terminated at the optical connectors at the second end of the cable, the optical connectors being held at the storage arrangement of the tray.

12. The drop terminal of claim 11, wherein the optical fibers at the first end of the optical cable are ribbonized.

13. The drop terminal of claim 12, wherein the ribbonized first end of the optical cable is spliced to an input cable extending through the input of the housing and through a potting region.

14. The drop terminal of claim 11, further comprising a management insert configured to removably couple to the tray body, the management insert being configured to manage an optical coupling between the optical cable and an input cable.

15. The drop terminal of claim 14, wherein the optical coupling is an optical splice; and wherein the management insert is configured to hold a splice protector that covers the optical splice.

16. The drop terminal of claim 15, wherein the input cable includes a plurality of optical fibers; and wherein the optical splice is a mass fusion splice between the optical fibers of the input cable and the optical fibers of the optical cable.

17. The drop terminal of claim 16, wherein the management insert is configured to hold a fanout in addition to the splice protector for the mass fusion splice, the fanout separating out the optical fibers from a ribbonized end of the optical cable.

18. The drop terminal of claim 15, wherein the input cable includes an optical fiber; and wherein the optical splice is a fusion splice between the optical fiber and a splitter input fiber, the splitter input fiber extending to a passive optical splitter that splits optical signals from the splitter input fiber to the optical fibers of the optical cable.

19. The drop terminal of claim 18, wherein the management insert is configured to hold the optical splitter in addition to holding the optical splice.

20. The drop terminal of claim 11, wherein the optical fibers of the optical cable have a common length.

* * * * *